United States Patent [19]

Wyman

[11] 4,224,166
[45] Sep. 23, 1980

[54] DRUM FILTER AND METHOD
[75] Inventor: Floyd H. Wyman, Greenville, S.C.
[73] Assignee: Marshall and Williams Company, Greenville, S.C.
[21] Appl. No.: 923,706
[22] Filed: Jul. 11, 1978
[51] Int. Cl.² .............................................. B01D 33/36
[52] U.S. Cl. ..................................... 210/396; 210/402
[58] Field of Search ............... 210/391, 393, 394, 396, 210/402, 403; 162/323, 357; 209/294, 299; 15/256.5

[56] References Cited

U.S. PATENT DOCUMENTS

| | | | |
|---|---|---|---|
| 558,572 | 4/1896 | Schacke | 210/396 X |
| 1,531,482 | 3/1925 | Haug | 210/403 X |
| 1,851,809 | 3/1932 | Carter | 210/403 X |
| 2,450,522 | 10/1948 | North | 210/394 X |
| 2,758,722 | 8/1956 | Murray | 210/394 X |
| 3,000,507 | 9/1961 | Young | 210/402 |

FOREIGN PATENT DOCUMENTS 561615 4/1957 Italy ......................................... 210/403

Primary Examiner—William A. Cuchlinski, Jr.
Attorney, Agent, or Firm—Bailey, Dority & Flint

[57] ABSTRACT

A filter for removing solids from a liquid of the type wherein a rotatable basket or drum has media inside straining from inside out. A power operated conveyor is mounted in the drum above the axis of rotation for receiving and positively removing solids. Thus, a liquid level is possible above the axis of rotation but below the conveyor so that a large filter area is in contact with the liquid while not interfering with the operation of the conveyor. A retractable scoop is provided for positively delivering the solids to the conveyor.

14 Claims, 6 Drawing Figures

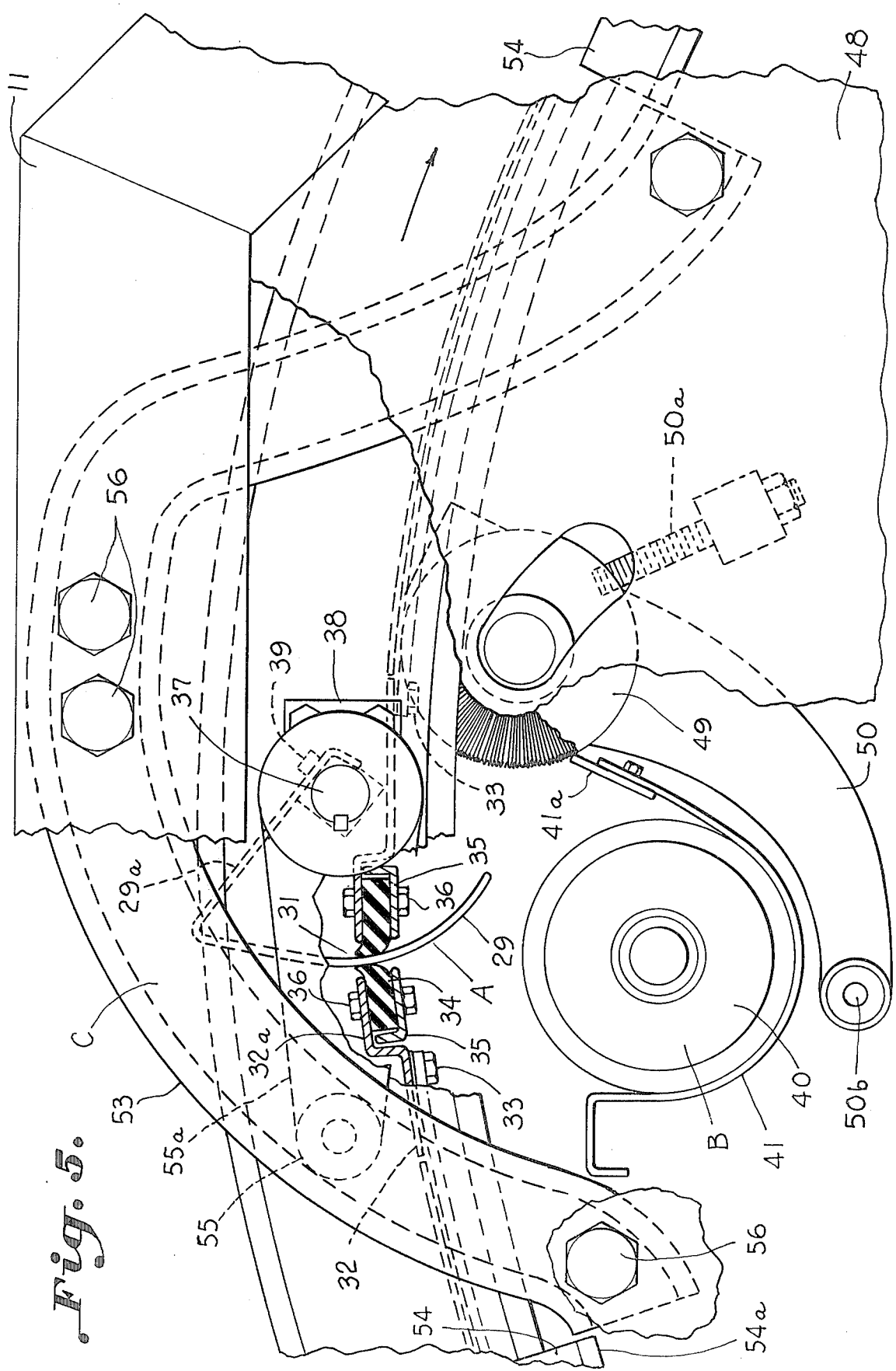

DRUM FILTER AND METHOD

This invention relates to apparatus for removing solid foreign materials from liquids and more particularly for removing floating, sinking, suspended solids and semi-solids or slime from liquids.

BACKGROUND OF THE INVENTION

More particularly, this invention relates to liquid filters employing the principle of screening liquid by passing it through a filter medium as the liquid flows from the inside of a rotating drum to the outside of the drum. These filters usually handle only those solids and slimes which cling to the filter medium and allow the rotating filter to lift the solids out of the liquid. As the filter clinging solids reach the top of the drum, they are back-washed into a trough for disposal in a semi-solid state. Non-clinging solids drop to and remain in the bottom of the rotating drum.

The present machine not only removes the solids clinging to the rotating drum filter, but also removes the solids, which sink to the bottom of the drum, by means of a scoop hinged to the outside of the drum and extending into the drum in pick-up position. As the scoop, rotating with the drum, nears the surface of the liquid in the upper part of the drum, it picks up the material tending to float to the top of the liquid and dumps it into a longitudinal conveyor.

In addition to filters presently in use, of the type described above wherein a pan catches water and solids from back-washing, relevant prior art includes U.S. Letters Pat. No. 2,758,722. The filter disclosed in this patent makes use of a plurality of circumferentially spaced fixed scoops in a lower corner of the inclined drum. No provision is made for cleaning scoops and scoop cavities. Material can easily build up in the scoop cavities to the point where they are filled and useless.

The embodiment of the present invention illustrated herein, a single line of scoops composed of a plurality of shorter scoops is shown but more could be utilized if needed. Each scoop has a gap between respective ends of the scoops. All scoops in one line are mounted on the same shaft and move together. These scoops are cleaned by withdrawing them through a seal of rubbery material each time the scoops are retracted. There are no longer any scoop cavities when the scoop is withdrawn from the filter area. This allows the brush to clean the area where the cavities were defined by the scoops.

Since the scoops of the aforesaid patent are fixed in place, the scraper cannot extend into the scoop area. Therefore, the adjacent end portion of the filter will become blinded and useless. No provision is made for controlled scoop drainage. It is very important that provision be made to control drainage of the scoops between the time they start to emerge from the liquid and the time they start to dump. If the scoops are not drained before they dump, liquid will be dumped into the conveyor. If drainage is not controlled, both the floating and sinking material may wash back out of the scoops as they emerge from the liquid. Control plates at the ends of the scoops illustrated herein are provided. These serve both to control drainage and to control current when submerged. The device of the patent design allows only a shallow pool of liquid in the bottom of the drum. This greatly limits the capacity of the filter. The filter of the present invention operates almost full. This gives an almost ideal head pressure and much more active filtering area. Moreover, a scraper would trowel or smear many materials into the media as when used in a poultry processing plant.

U.S. Letters Pat. No. 1,531,482 illustrates a filter used as a paper making machine utilizing a brush and axially aligned screw conveyor. There is no provision for maximizing the area of filter media utilized and no scoop concept is employed.

SUMMARY OF THE INVENTION

It has been found that a vastly improved filter of increased capacity and versatility may be provided employing a rotating drum which filters from inside out wherein a power operated conveyor, aligned with the axis of rotation but positioned thereabove, positively removes solids separated from the liquid from the drum. A retractable scoop having spaced finders to promote drainage, discharges the solids by gravity into the conveyor.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is an enlarged end elevation looking toward the right hand end of FIG. 3, with parts omitted and parts in section, illustrating scoop, conveyor and brush mountings.

DESCRIPTION OF A PREFERRED EMBODIMENT

Figures 1, 2:
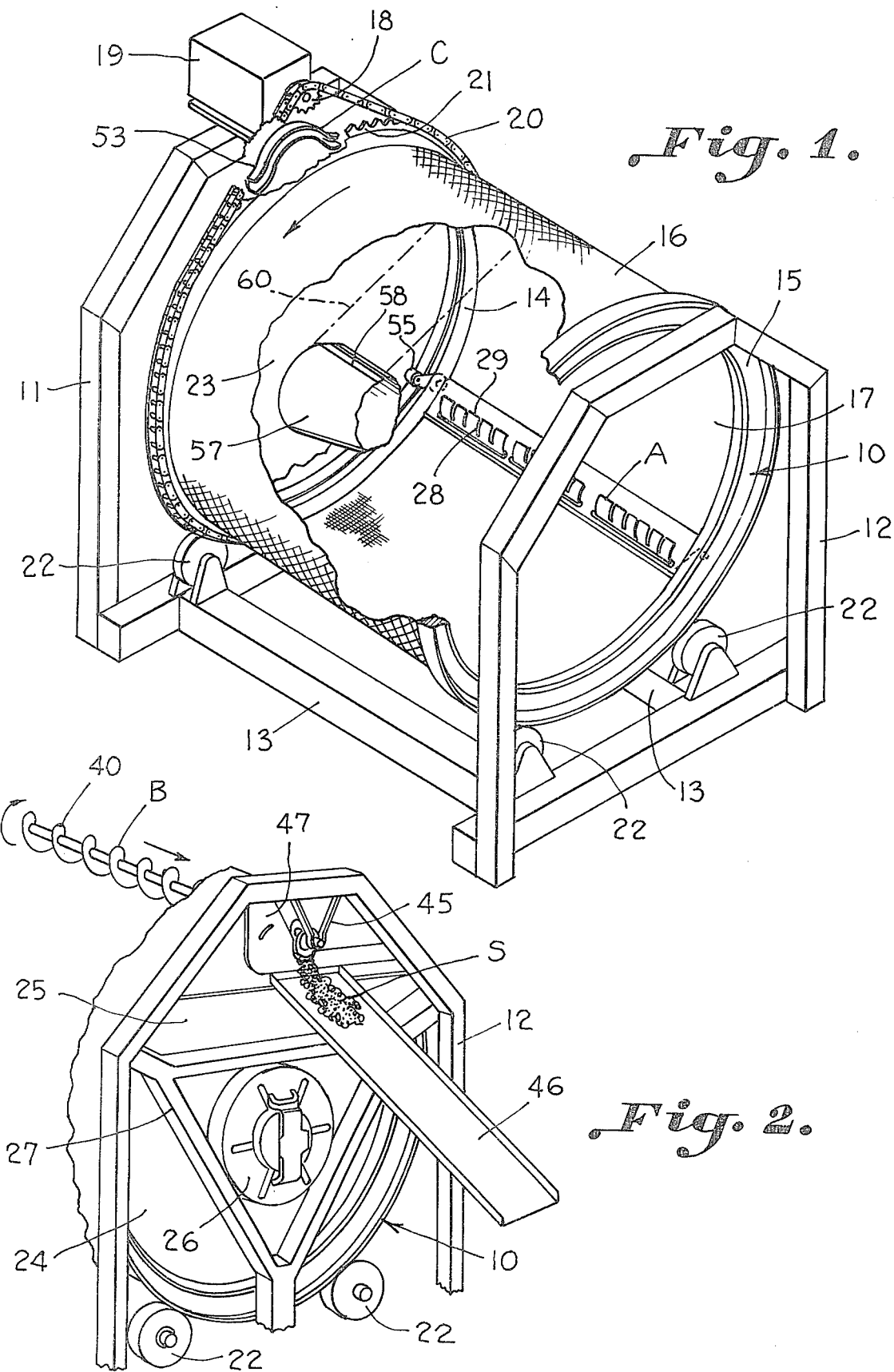
FIG. 1 is a perspective view illustrating a rotating drum filter constructed in accordance with the present invention, with parts omitted and parts broken away to show the scoops and operating mechanism therefor at the inlet end of the filter.
FIG. 2 is a similar perspective view, illustrating power operated conveyor means including a screw removing solids from the drum.

The drawing illustrates a rotating drum filter having liquid filter media carried internally of the drum conforming thereto for retaining solids while the filtered liquid passes therethrough. The improvement contemplates a scoop A extending within the drum for collecting solids from the liquid in the drum and carrying the solids upwardly from the liquid. Conveyor means B comprising a screw is carried above the axis of rotation and above the liquid for removing solids from the drum. Means C comprising a cam is provided for retracting the scoop for discharging solids collected thereby into the transverse conveyor means for removal from the drum.

The filter illustrated in the drawings has an elongated basket or drum broadly designated at 10, carried for rotation within an elongated frame. The frame has vertical end members 11 and 12 joined by spaced longitudinal supports 13. The drum 10 has flanged end rims 14 and 15 joined by an expanded metal midsection 16 which has large openings therein, but which is suitable for supporting screen type filter media 17 on the inside thereof. The filter media is preferably of the permanent variety such as stainless steel, which may range in porosity from coarse to fine. The drum is turned by a sprocket 18 which serves as a power takeoff from the motor 19 to drive a chain 20. The chain 20 is passed around a toothed driving portion 21, carried around the circumference of the drum adjacent the flanged end rim member 14. In order to facilitate rotation of the basket or drum, spaced idler wheels 22 are carried adjacent each inside corner of the frame forming a cradle drive member.

Figure 6:
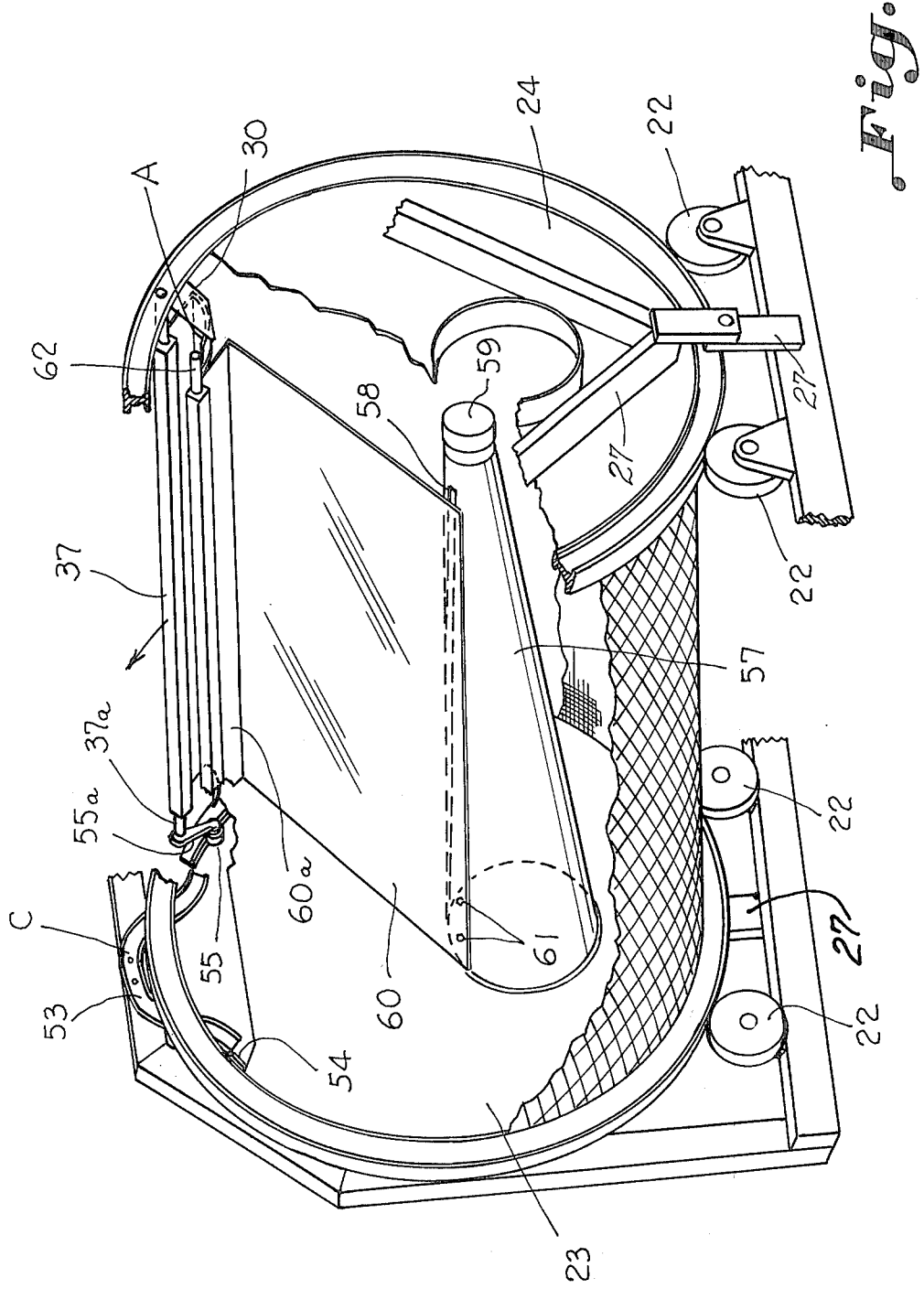
FIG. 6 is a perspective view illustrating inlet distributor pipe, baffles and scoop arrangement for collecting floating solids such as lint in a textile filtering operation.

Referring especially to FIGS. 1 and 6, it will be noted that the end member 14 of the drum carries a head end closure 23. By reference to FIG. 2, it will be noted that a head 24 is suitably provided at the opposite end of the frame adjacent the vertical support 12. The opposed heads 23 and 24 providing sealing engagement with the respective end rim members 14 and 15. The drum 10 is carried to deliver filtered liquid to a tank 25 which has an outlet 26. If desired, the liquid may simply flow through an open bottom in the tank or be otherwise handled after it passes through the media 17 carried within the drum. The head 24 is provided with a cover 26 for an opening through which access may be had to the interior of the drum. A stationary Y-shaped support is illustrated at 27 in FIGS. 2 and 6 fixed to the stationary closure heads 23 and 24.

Figure 4:
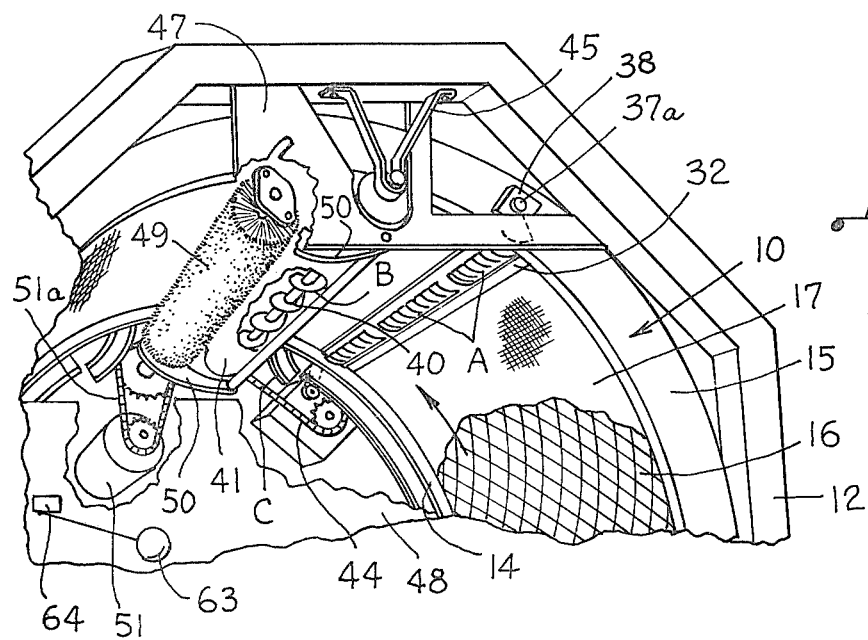
FIG. 4 is an enlarged perspective view looking toward the upper left hand end of FIG. 3 with head removed, illustrating scoop and conveyor and brush mountings with drives therefor as well as liquid level control means.

The scoop A is retractable and includes a plurality of spaced slotted sections. The slots 28 define finger portions 29 which curve arcuately inwardly forming cavities and the slots are provided for effecting rapid drainage of the scoop. The scoop may be provided with baffle end portions such as illustrated in FIG. 6 at 30. The scoop sections extend through spaced slots 31 (FIGS. 3 and 5) carried in a longitudinal support 32 carried by the drum exteriorly of the expanded metal portion. An opening is also defined within the internal filter 17 which is secured by longitudinally spaced bolts 33 on each side of the support 31. The support 31 has a cavity therein defined by upwardly extending bracket portions 32a which contain a suitable seal or gasket 34 formed of deformable rubbery material. The metal retaining strips 35 are provided with bolts 36 for securing the gaskets 34 within the opposed cavities formed by the bracket portions 32a. The scoop sections are carried on a shaft 37 which is oscillatably mounted as in the opposed brackets 38. The scoop sections are fastened to an intermediate portion of the shaft 37 of square cross-section by a suitable fastening member 39. The fingers 29 are joined on one end as by a bracket portion 29a extending at an angle thereto for securement by the fastener 39. The fingers extend inwardly, preferably at an acute angle as illustrated, and thence extend arcuately inwardly forming a cavity between them and the media. The scoop is normally maintained in the position shown in FIGS. 1, 4 and 6 prior to being withdrawn, as is commencing in FIG. 5.

Figure 3:
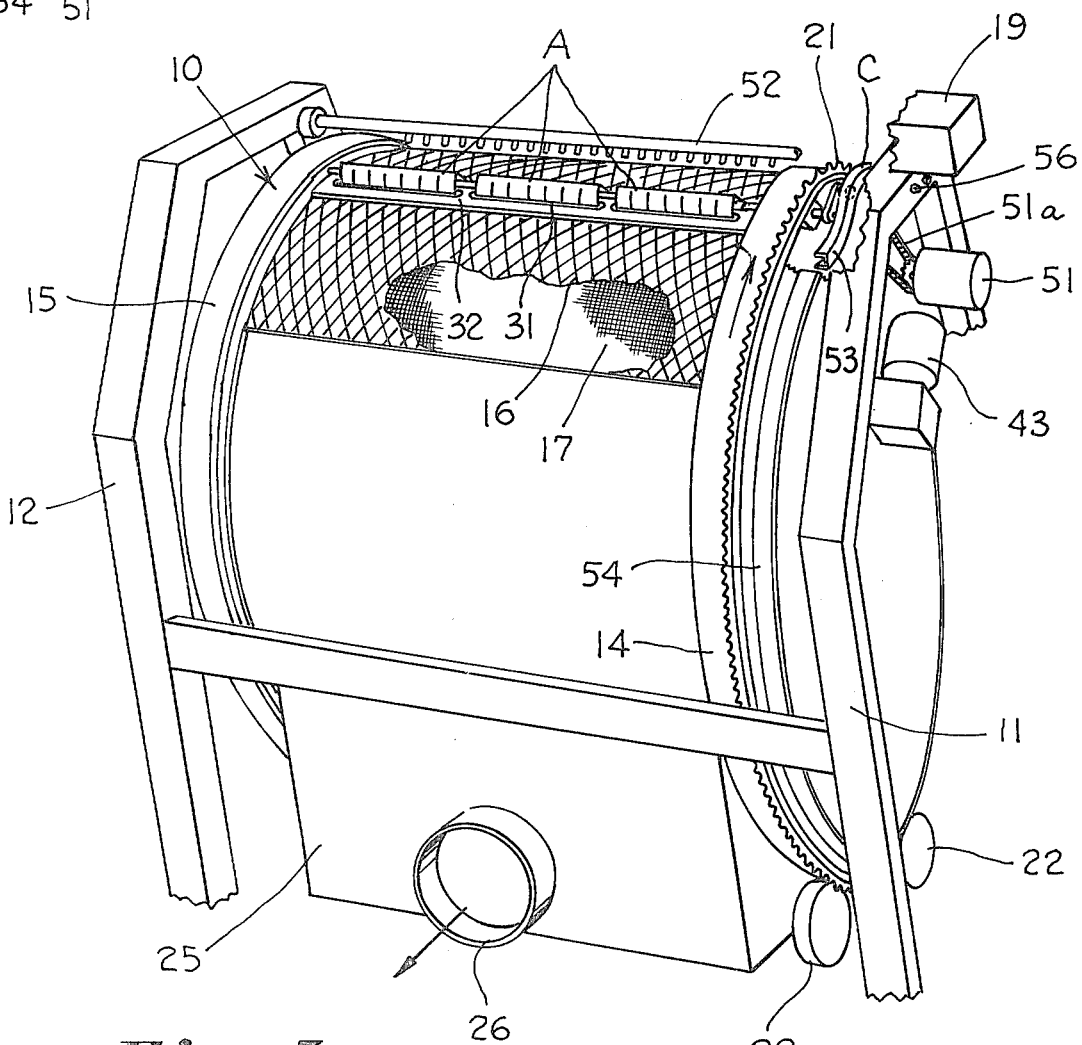
FIG. 3 is a perspective view looking from an opposite end of the filter illustrating the drive for the rotating drum with tank and outlet for filtered liquid cradle mounting for the drum, and scoop operating means.

It is important that the scoop discharge any solids collected in the cavity thereof into the screw conveyor B which includes a screw member 40 carried in a trough 41. The screw is driven by a suitable motor 43 as through a chain drive 44. FIG. 2 illustrates the mounting of the screw 40 within depending brackets 45. The solid material S deposited from the scoop may be carried off from the delivery end of the screw within a suitable chute 46 illustrated in FIG. 2 or by other suitable means. A bracket 47 is provided at the discharge end of the screw conveyor while a similar bracket 48 is carried at the opposite end. The conveyor is followed by a brush 49 carried by suitable brackets 50 each pivoted on one end 50b on respective brackets 47 and 48, the position of which, with respect to the media, is adjustable by the threaded means 50a. The brush 49 is driven by a suitable motor 51 through a chain drive 51a. The trough 41 has a knife edge 41a carried at one end for cleaning the outer periphery of the brush. FIG. 3 illustrates a spray bank 52 which may follow the action of the brush in order to provide a backspray upon the filter media if desired.

Cam means C are provided for raising the scoop when passing over the conveyor B in order to dump the solids collected in the filter operation and includes a cam 53 and an angle 54 having a flange 54a for retaining the cam follower 55 therewithin. The flange 54a extends entirely about the filter except for that portion occupied by the camming section 53. The camming section 53 is connected as by bolts 56 to the end frame member 11. The cam follower 55 has a link 55a which has suitable fixed connection with the shaft 37 as by a shank portion 37a. After passing the brush, the cam means returns the scoop to its operative position extending within the drum to form cavities for collecting solids rejected by the filter media.

Referring now more particularly to FIGS. 1 and 6, it will be noted that a distribution pipe 57 is carried by the head 23 and serves as an inlet for bringing liquid to be filtered within the drum and for distributing the liquid through the drum through the slot 58 therein. A closed cap end is illustrated at 59. The taper is provided from the inlet end to the cap in order to distribute the liquid uniformly within the drum. The cap end is illustrated as being adjacent the head 24. A lateral and upwardly inclined baffle 60 is provided, above the slot for collecting solids therebeneath and is attached as by screw 61 to the distribution pipe 67 along one edge, whereas an opposite edge which has an angular extension 60a is suitably secured to a rod 62. The floating solids move upwardly along the underside of the baffle for collection by the scoop as it passes the upper end of the baffle.

A float 63 is provided for actuating a switch 64 for controlling the liquid within the filter at a predetermined level. The filter starts only when the screen has blinded to the point where more clean screen is needed to handle the incoming flow. As soon as enough clean screen has rotated below water level to handle this flow the float drops and stops the filter. Thus, when using the float switch control the filter will turn on and off as is needed. Alternate means of controlling the filter may, of course, be employed. Examples would be allowing a float, bubble tube or other level sensing device to control the speed of rotation so as to match incoming flow of liquid. Another common means of control is by use of timers.

OPERATION

As stated above, prior filters are limited to use with those materials which can be made to cling to the filter medium, and they depend on the filter medium to lift this material out of the liquid so that it can be disposed of. Generally speaking this restricts them to those materials in suspension in the supporting liquid. Users of these filters usually depend on other devices to handle any materials which are heavy enough to sink to the bottom or light enough to rise to the surface of the liquid. Devices constructed in accordance with the present invention not only handle those materials which cling to the filter medium, but in addition, would handle both those materials which sink to the bottom and those materials which rise to the top and float. The scoop is hinge mounted to the outside of the drum and extends through the drum to the inside of the drum when it is in the pick-up position. As the scoop rotates with the drum, it picks up any material which has sunk to the bottom of the drum. As the scoop, rotating with the drum, emerges from the surface of the liquid, near the top of the drum, it also picks up those materials which are floating on the surfaces and which move toward one end of the liquid surface due to currents generated in the liquid by rotation of the drum or by means of the baffle 60. These materials are then carried to the top of the drum where they are dumped into a screw conveyor.

Almost all of the inside surface of the filter drum is covered with a filter medium in a method similar to that employed by other internal drum filters in present use and maximum utilization is made thereof since the liquid may rise in normal operation above the axis of rotation. A rotating brush removes the material which is still clinging to the filter medium directly into the screw conveyor. The scoop retracts as it approaches the brush. This serves two purposes, i.e., it dumps the material into the screw conveyor and it enables the scoop to pass the brush. As soon as the scoop has rotated past the brush, it is returned to the pick-up position inside of the drum. To prevent leaks around the scoop, a molded elastomeric seal through the wedge action illustrated in FIG. 5, seals the area around the scoops in much the same manner as weather stripping seals around a door and wipes the scoop fingers clear. The slots in the scoop enable excess liquid to drain out as the scoop moves the liquid surface to the conveyor. This keeps excess liquid from being dumped into the conveyor.

While a Preferred embodiment of the invention has been described using specific terms, such description is for illustrative purposes only, and it is to be understood that changes and variations may be made without departing from the spirit or scope of the following claims.

What is claimed is:

1. In filter having a perforate drum rotatable about a longitudinal axis with liquid filter media carried internally of the drum conforming thereto for retaining solids within the drum while the filtered liquid passes through the drum, the improvement comprising:
    longitudinal scoop means extending transversely within said drum for collecting solids from liquid in said drum and carrying the solids upwardly from the liquid;
    conveyor means extending longitudinally within the drum carried above the liquid for removing solids from the drum; and
    means retracting said scoop means for discharging solids collected thereby onto said transverse conveyor means.

2. The structure set forth in claim 1 including an oscillatory mounting for said scoop means carried by the drum longitduinally thereof for retracting said scoop means from and replacing said scoop means in transverse position with said drum.

3. The structure set forth in claim 2 wherein said means retracting said scoop means includes cam means carried in fixed position externally of said drum for oscillating said scoop means.

4. The structure set forth in claims 1, 2, or 3 wherein said scoop means includes a plurality of longitudinally spaced fingers.

5. The structure set forth in claim 4 including a wiping member within said drum for removing solids collected by the scoop means therefrom.

6. The structure set forth in claim 5 including means at least partially closing a cavity formed by said scoop means at the ends thereof.

7. Apparatus for filtering solids from a liquid comprising a rotating drum filter for retaining solids while the filtered liquid passes therethrough:
    a retractable scoop extending within said drum adjacent an inner surface thereof for collecting solids from liquid in said drum and carrying the solids upwardly from a level of liquid within the drum; and
    power operated conveyor means carried above the liquid for receiving solids from said scoop and removing them from the drum.

8. The structure set forth in claim 7 including a stationary head member carried in each end of said drum extending above a predetermined liquid level in said drum, and wherein said power operated conveyor means is carried above a horizontal axis of rotation of the drum.

9. The structure set forth in claim 7, wherein said retractable scoop includes a plurality of spaced aligned fingers which extend arcuately inwardly of the drum to form cavities for collecting and for draining the solids within the drum.

10. The structure set forth in claim 9, wherein said fingers are carried in a plurality of spaced aligned sections each of which has a baffle at an end portion preventing loss of the solids at such end.

11. A liquid filter comprising:
    a cylindrical horizontally disposed perforate drum for retaining solids therein while permitting filtered liquid to flow therethrough;
    means supporting said drum for rotation about a horizontal axis;
    a head member carried within said perforate drum at each end thereof stationary with respect to said perforate drum which rotates thereabout;
    a driven conveyor carried adjacent the top of and substantially the entire length of said drum above said horizontal axis; and
    means removing solids retained within said drum and depositing them adjacent the top thereof by gravity onto said conveyor for removal through a head member above said horizontal axis;
    whereby the liquid level of said filter may be maintained substantially above said horizontal axis affording an increased filter capacity.

12. The structure set forth in claim 11, wherein said driven conveyor is a screw conveyor.

13. The structure set forth in claim 12, including a distribution pipe carrying the liquid to be filtered through a head member, and a baffle extending on one side thereof above a flow of liquid from said distributor pipe.

14. The structure set forth in claim 13 including, scoop means carried by and extending within said drum, said baffle terminating short of said scoop means.

* * * * *